(12) United States Patent
Rodney (10) Patent No.: US 6,750,783 B2
(45) Date of Patent: Jun. 15, 2004

(54) LOW FREQUENCY ELECTROMAGNETIC TELEMETRY SYSTEM EMPLOYING HIGH CARDINALITY PHASE SHIFT KEYING

(75) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/190,165

(22) Filed: Jul. 5, 2002

(65) Prior Publication Data

US 2004/0004553 A1 Jan. 8, 2004

(51) Int. Cl.⁷ .................................................. G01V 1/22
(52) U.S. Cl. .............................. 340/855.4; 340/855.7
(58) Field of Search .................... 340/853.3, 854.6, 340/853.2; 714/792; 367/83, 84, 82; 166/104; 73/152.58; 175/195

(56) References Cited

U.S. PATENT DOCUMENTS

| | | | |
|---|---|---|---|
| 4,215,427 A | * 7/1980 | Waggener et al. | 367/83 |
| 4,302,757 A | 11/1981 | Still | 340/854 |
| 4,468,665 A | * 8/1984 | Thawley et al. | 340/853.2 |
| 4,691,203 A | 9/1987 | Rubin et al. | 340/856 |
| 4,725,837 A | 2/1988 | Rubin | 340/855 |
| 4,766,442 A | 8/1988 | Issenmann | 343/719 |
| 6,560,293 B1 | * 5/2003 | Alelyunas et al. | 375/261 |

OTHER PUBLICATIONS

Byron J. Sand, *Advances In Electromagnetic MWD Technology*, Sperry Sun Drill Services of Canada (pp. 1–15).

*MWD/LWD Systems*, Sperry–Sun SL0056, rev. A, Dec. 11, 1998 (pp. 1–21).

L.A. (Bill) Rubin; *Wireless Electromagnetic Borehole Communications A State–of–the–Art Review;* Measurement While Drilling Symposium, Louisiana State University, Baton Rough, LA, Feb. 26–27, 1990; pp 1–12.

* cited by examiner

*Primary Examiner*—Michael Horabik
*Assistant Examiner*—Hung Dang
(74) *Attorney, Agent, or Firm*—Conley Rose, P.C.

(57) ABSTRACT

A downhole electromagnetic telemetry system with an increased data rate is provided. In one embodiment, a PSK data transmission system is used to transmit data in a downhole electromagnetic telemetry system for Measure While Drilling (MWD) applications. MWD applications suffer from data rates that are not well suited for the ever-increasing amount of data that needs to be transmitted. One method of increasing the data rate includes increasing the cater frequency, but this can cause undesirable signal attenuation and distortion. Conversely, decreasing the carrier frequency provides the reward of a stronger signal at the risk of aliasing, especially with wide bandwidth signals. A derivation predicts that the frequency may actually be decreased while increasing the number of phase states to achieve a higher data rate, without affecting the bandwidth. The described system and method may advantageously provide a robust, low-power electromagnetic telemetry system with an increased data rate.

36 Claims, 7 Drawing Sheets

Four-Phase PSK Message Sequence Assignment

| Binary Bit Group | Carrier Phase | Transmitted Signal |
| --- | --- | --- |
| 00 | +45° | $s(t) = \dfrac{A_c}{\sqrt{2}} [\cos\omega_c t - \sin\omega_c t]$ |
| 01 | -45° | $s(t) = \dfrac{A_c}{\sqrt{2}} [\cos\omega_c t + \sin\omega_c t]$ |
| 10 | +135° | $s(t) = -\dfrac{A_c}{\sqrt{2}} [\cos\omega_c t + \sin\omega_c t]$ |
| 11 | -135° | $s(t) = -\dfrac{A_c}{\sqrt{2}} [\cos\omega_c t - \sin\omega_c t]$ |

FIG. 7

Decoding Rule for Figure 5 and the Phase Assignment of Figure 7

| $f_i$ | $f_q$ | $\theta_I$ | Decoded Bit Group |
| --- | --- | --- | --- |
| $\dfrac{A_c}{\sqrt{2}}$ | $-\dfrac{A_c}{\sqrt{2}}$ | 45° | 00 |
| $\dfrac{A_c}{\sqrt{2}}$ | $\dfrac{A_c}{\sqrt{2}}$ | -45° | 01 |
| $-\dfrac{A_c}{\sqrt{2}}$ | $-\dfrac{A_c}{\sqrt{2}}$ | 135° | 10 |
| $-\dfrac{A_c}{\sqrt{2}}$ | $\dfrac{A_c}{\sqrt{2}}$ | -135° | 11 |

LOW FREQUENCY ELECTROMAGNETIC TELEMETRY SYSTEM EMPLOYING HIGH CARDINALITY PHASE SHIFT KEYING

BACKGROUND OF THE INVENTION

1. Field of the Invention

The present invention relates to formation logging techniques. More particularly, the present invention relates to a telemetry system for transmitting data from a downhole drilling assembly to the surface of a well.

2. Description of the Related Art

Modern petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging," can be performed by several methods.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

The problem with obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and stacked on the platform (if offshore). Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there has been an increased emphasis on the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD." Similar techniques, concentrating more on the measurement of formation parameters, commonly have been referred to as "logging while drilling" techniques, or "LWD." While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

When oil wells or other boreholes are being drilled, it is frequently necessary or desirable to determine the direction and inclination of the drill bit and downhole motor so that the assembly can be steered in the correct direction. Additionally, information may be required concerning the nature of the strata being drilled, such as the formation's resistivity, porosity, density and its measure of gamma radiation. It is also frequently desirable to know other downhole parameters, such as the temperature and the pressure at the base of the borehole, for example. Once this data is gathered at the bottom of the borehole, it is necessary to communicate it to the surface for use and analysis by the driller.

Sensors or transducers typically are located at the lower end of the drill string in MWD systems. Typically, the downhole sensors employed in MWD applications are positioned in a cylindrical drill collar that is positioned close to the drill bit. While drilling is in progress these sensors continuously or intermittently monitor predetermined drilling parameters and formation data and transmit the information to a surface detector by some form of telemetry. There are a number of telemetry systems in the prior art which seek to transmit information regarding downhole parameters up to the surface without requiring the use of a wireline tool. A widely used telemetry system used in MWD applications is the mud pulse system.

The mud pulse system of telemetry creates "acoustic" pressure signals in the drilling fluid, sometimes called "mud," that is circulated under pressure through the drill string during drilling operations. The information that is acquired by the downhole sensors is transmitted by suitably timing the formation of pressure pulses in the mud stream. The information is received and decoded by a pressure transducer and computer at the surface.

In a mud pressure pulse system, the drilling mud pressure in the drill string is modulated by means of a valve and control mechanism, generally termed a pulser or mud pulser. The pulser is usually mounted in a specially adapted drill collar positioned above the drill bit. The generated pressure pulse travels up the mud column inside the drill string at the velocity of sound in the mud. Depending on the type of drilling fluid used, the velocity may vary between approximately 3000 and 5000 feet per second. The rate of transmission of data, however, is relatively slow due to pulse spreading, distortion, attenuation, modulation rate limitations, and other disruptive forces, such as the ambient noise in the drill string. A typical pulse rate is on the order of a pulse per second (1 Hz).

With recent developments in sensing and steering technologies available to the driller, the amount of data that can be conveyed to the surface in a timely manner at 1 bit per second is sorely inadequate. As one method for increasing the rate of transmission of data, it has been proposed to transmit the data using vibrations in the tubing wall of the drill string rather than depending on pressure pulses in the drilling fluid. However, early systems have proven to be unreliable at data rates greater than about 3 bits/s due to acoustic reflections at tool joints and variations in the geometry of the tubing and borehole.

Additionally, mud pulse telemetry requires fairly dense drilling fluid, rendering it useless in applications like Underbalanced Drilling (UBD) in which aerated, low density fluids are necessary or desired.

SUMMARY OF THE INVENTION

Accordingly, there is disclosed herein a reliable downhole electromagnetic telemetry system, which overcomes disadvantages of previous telemetry methods. In a preferred embodiment, a phase shift keying electromagnetic data transmission system is used to transmit data for MWD applications.

In accordance with the preferred embodiment, an antenna is configured to transmit low frequency electromagnetic signals while a phase-shift key (PSK) transmitter is configured to receive digital signals indicative of telemetry data and convert the digital signals into a PSK transmit signal. The PSK transmitter provides the transmit signal to the antenna, and the PSK transmit signal has a carrier frequency of no more than about 1 Hz, and a signal constellation with more than 4 phase states. The PSK transmit signal may also include a transmit signal with a symbol period of two or more carrier cycles.

In another embodiment of the present invention, a method of logging while drilling is disclosed where a hole is drilled through a formation with a drill bit attached to a drill string that includes a sensor package. Signals are then detected that indicate formation properties. These signals are then provided to the PSK transmitter, where they are encoded to obtain a digital transmit signal that is phase modulated on a low-frequency carrier signal to obtain a PSK signal with a frequency of no more than about 1 Hz and with no more than 4 phase states. The low-frequency PSK signal is then transmitted to the surface. The system and method disclosed may advantageously provide a robust, low-power electromagnetic telemetry system with an increased data rate relative to mud pulse telemetry systems and other conventional telemetry systems.

Therefore, despite the reluctance to drop the carrier frequency because of reduced data rate concerns, it is believed that any data rate reduction caused from dropping the frequency can be overcome by increasing the number of phase states without increasing bandwidth. With the carrier frequency dropped according to the embodiments, the electromagnetic telemetry system can be enhanced by using multiple carriers and amplitude modulation.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

MWD applications suffer from data rates that are not well suited for the ever-increasing amount of data that needs to be transmitted. One method of increasing the data rate includes increasing the carrier frequency, but this can cause undesirable signal attenuation and distortion. On the other hand, decreasing the carrier frequency provides the reward of a stronger signal at the risk of aliasing, especially with wide bandwidth signals. A derivation is disclosed herein that predicts that the frequency may actually be decreased while increasing the number of phase states to achieve a higher overall data rate, without affecting the bandwidth or causing signal aliasing.

Figure 1:
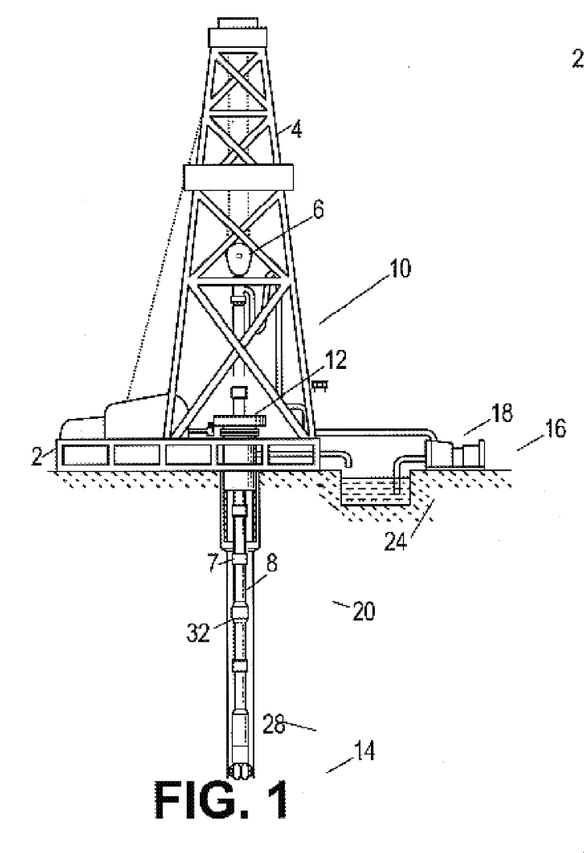
FIG. 1 is a schematic view of an oil well in which an electromagnetic telemetry system may be employed.

Turning now to the figures, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that is used to lower the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods. Drilling fluid, termed mud, is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations. However, the system of FIG. 1 is not restricted to the use of mud as a drilling fluid. For example, in the case of under balanced drilling (UBD), other media such as aerated fluids or air/mist mixtures may be preferred over mud.

In a preferred embodiment, a data telemetry system is used in the a downhole tool 28 such that MWD is accomplished by transmitting data from the downhole tool 28 electromagnetically. It should be noted that while downhole tool 28 is shown in close proximity to the drill bit 14, it may be placed at any point along the drill string as desired.

Figure 2:
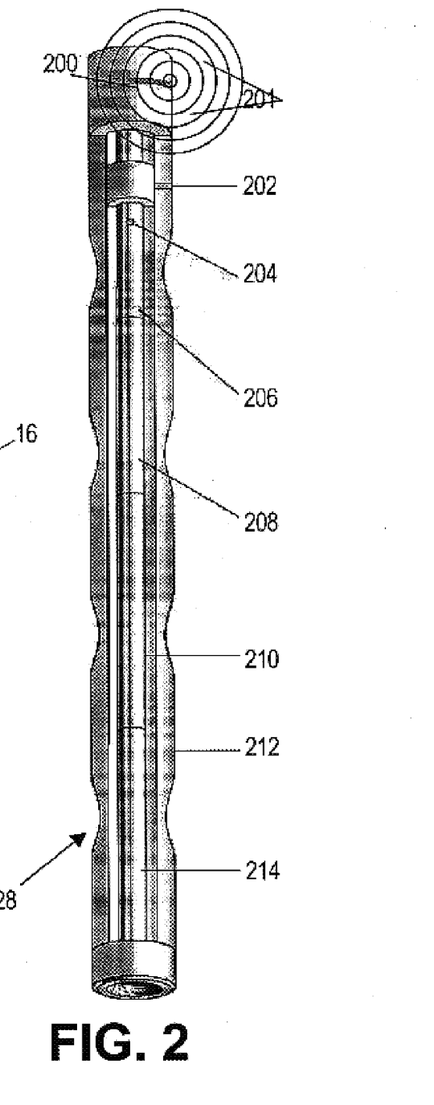
FIG. 2 is a view of a downhole tool used in electromagnetic telemetry.

Referring now to FIG. 2, downhole tool 28 is shown in more detail. As shown downhole tool 28 includes an insulator 200, antenna 201, annular port 202, internal port 204, electronics module 206, battery module 208, gamma sensor 210, and directional sensor 214, all of which are housed in a drill collar 212. However it should be noted that the contents of downhole tool 28 as shown are not an exhaustive list of its contents as would be evident to one of ordinary skill in the art.

The insulator 200 separates the upper and lower portions of the antenna 201, and data is transmitted to the surface by inducing an alternating voltage difference across the insulator 200, thereby generating the electromagnetic signal. At the surface, the electromagnetic signal is preferably received as a voltage potential between the conductive drill string and a ground electrode (not shown). One or more repeater modules 32 may be provided along the drill string to receive electromagnetic telemetry signals from downhole tool 28 and retransmit them to the surface. The repeater modules 32 preferably include both an electromagnetic telemetry receiver and an electromagnetic telemetry transmitter.

The annular port 202 helps to measure annular pressure; while the internal port 204 helps measure internal pressure. Gamma sensor 210 measures radiation and directional sensor 214 measures the orientation of the drill string. Power is provided to the various sensors and electronics in the downhole tool 28 by the battery module 208. The various measurements from the sensors are reported to the electronics module 206 where they are processed. Processing the signals may include: digitizing analog sensor measurements into binary data, storing the information in local memory, compressing data for efficient transmission, as well as any other tasks evident to one of ordinary skill in the art.

In addition, electronics module 206 includes a transmitter to transmit data using electromagnetic signaling techniques, where the transmitter is preferably a phase shift keying (PSK) transmitter. As well as containing a PSK transmitter electronics module 206 may contain a PSK receiver further enabling uphole and downhole communications.

Figure 3:
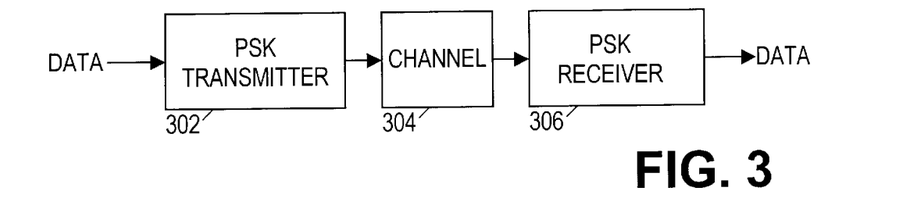
FIG. 3 is a functional block diagram of an electromagnetic telemetry system employing phase shift keying.

As shown in FIG. 3, the electromagnetic PSK telemetry system may be modeled using three functional blocks: a channel 304, a PSK transmitter 302, and a PSK receiver 306. As mentioned above, to produce the electromagnetic signal, a voltage difference is generated across the insulator 200. The electromagnetic signal then travels to the surface through the formation being drilled while being guided along by the electrically conductive drillstring. On the surface, the electromagnetic wave is received as a voltage potential between the rig 4 and a ground electrode placed in the proximity of the rig. Thus, the channel 304 by which PSK transmitter 302 and PSK receiver 306 communicate includes the transmitting antenna, the formation being drilled, the drill string acting to guide the electromagnetic wave, and the receiving electrode.

Figure 4:
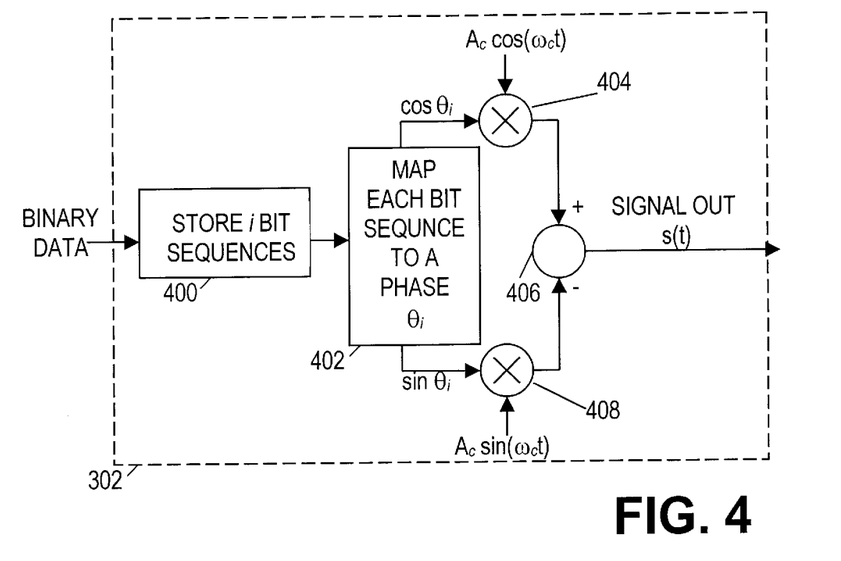
FIG. 4 is a functional block diagram of a phase shift keying transmitter.

Referring now to FIG. 4, a block diagram illustrating a possible PSK transmitter 302 is shown. A binary data stream, which preferably has been processed and prepared for transmission, is passed through block 400, which stores the data stream in bit sequences or bit groups. In block 402, each bit sequence is then mapped to a phase, where each phase corresponds to a unique bit sequence. One of the paths coming from block 402 contains the Sine of each phase that is mixed with the Sine of a carrier signal using mixer 408. Another path coming from block 402 contains the Cosine of each phase that is mixed with the Cosine of a carrier signal using mixer 404. The output of the mixer blocks 404 and 408 are fed into an add/subtract block 406, and the signal out comprises combinations of Sine and Cosine functions which represent the signal to be transmitted over the channel 304.

Figure 7:
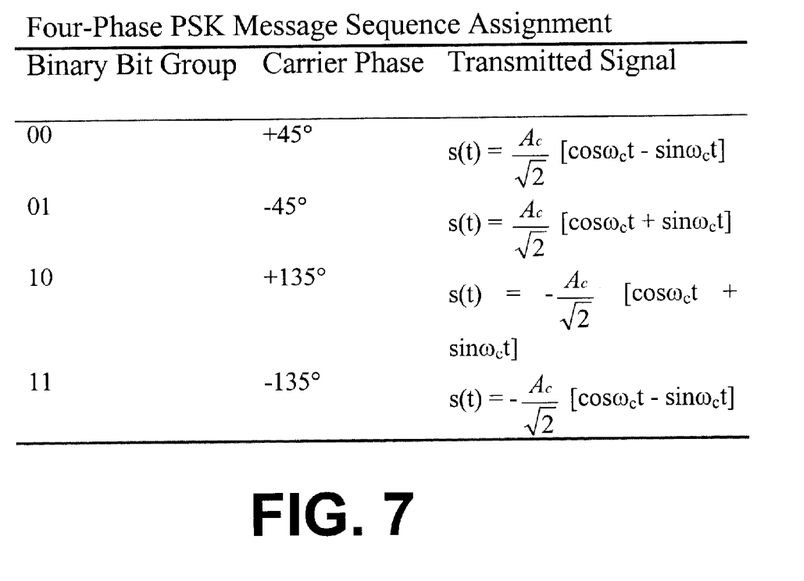
FIG. 7 shows a four-phase message sequence assignment.

FIG. 7 shows a four-phase PSK sequence assignment and will be explained with respect to the transmitter of FIG. 4. In four-phase PSK, the binary data stream is broken up into groups of two binary bits where each group of bits is represented by a different transmitted phase. Since the number of bits "i" transmitted during each symbol interval equals 2, then this makes a total of $2^i$ possible groups of binary bits, or 4. Therefore there must be four different transmitted phases, or one for each bit group. If on the other hand there were 3 binary bits per symbol this would result in $2^3$ or 8 possible groups of bits, which would require eight different transmitted phase states.

Typically the phase states are spaced equally apart such that the transmitted phases for four-phase PSK would be 360°/4 or 90° apart, thus one possible set as seen in FIG. 7 is {±45°, ±135°}. The transmitted signal out of block 406 s(t) is $$s(t)=A_c \cos[\omega_c t+\theta_i], \quad (1)$$

i=1, 2, 3, 4, where the phases to the groups of binary bits are assigned according to FIG. 7. The transmitted signal of Equation (1) can be rewritten using a trigonometric identity as $$s(t)=A_c \cos \theta_i \cos \omega_c t - A_c \sin \theta_i \sin \omega_c t. \quad (2)$$

Thus, the in-phase and quadrature components are easily seen in Equation 2, and FIG. 7 contains the signal transmitted during the symbol interval.

Figure 5:
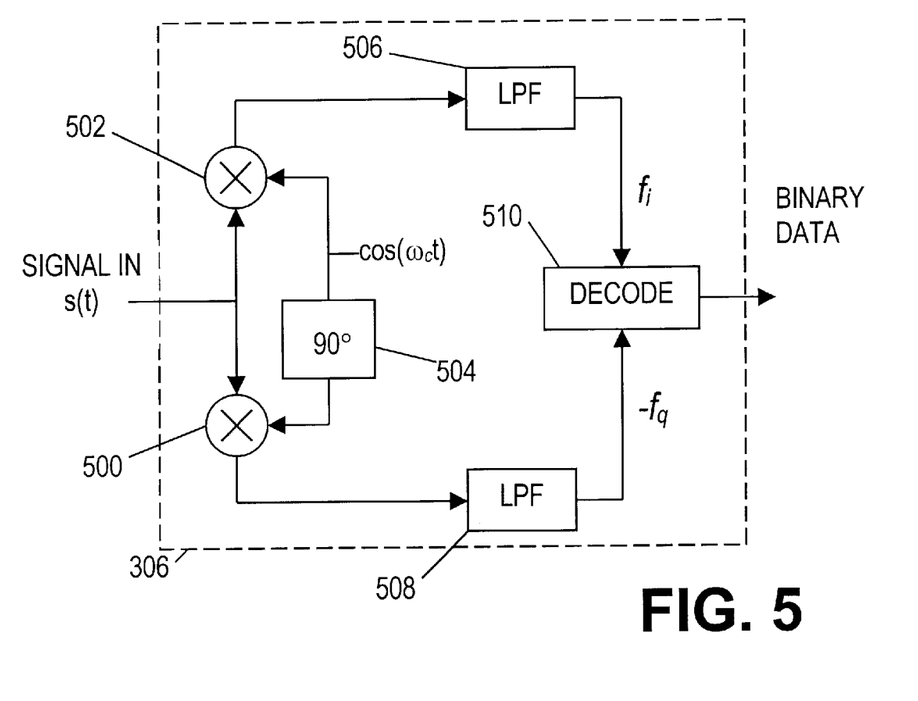
FIG. 5 is a functional block diagram of a phase shift keying receiver.
Figure 8:
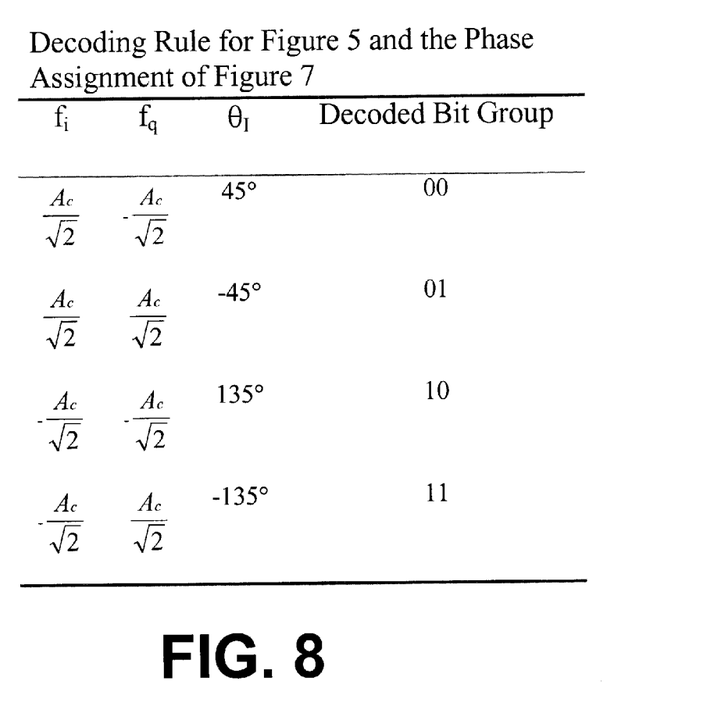
FIG. 8 shows a decoding rule for the decoder of FIG. 5.

Referring now to FIG. 5, a block diagram illustrating a possible PSK receiver 306 is shown. The signal in is passed through multiplier 500 and 502. Multiplier 500 mixes the incoming signal with the carrier frequency containing a 90° phase shift to produce the quadrature component $f_q$. Multiplier 502 meanwhile mixes the signal in with the carrier frequency to produce the in-phase component $f_i$. Both the in-phase and quadrature components are passed through low pass filters 506 and 508 respectively. At this point the in-phase and quadrature components may be gained up as necessary before arriving at decoder 510. FIG. 8 contains an exemplary decoding rule assignment for the receiver according to FIG. 5 and using the example phase assignment of FIG. 7.

It should be mentioned that the transmitter of FIG. 4 and the receiver of FIG. 5, as well as the four-phase PSK example contained herein may not be optimum and are intended for discussion purposes only.

Current MWD applications have an increasing number of sensors generating an increasing amount of data and this often creates a data bottleneck because the achievable data rates cannot keep pace with the increased data output. Therefore in most telemetry systems, it is desirable to improve the data rate.

Figure 6A:
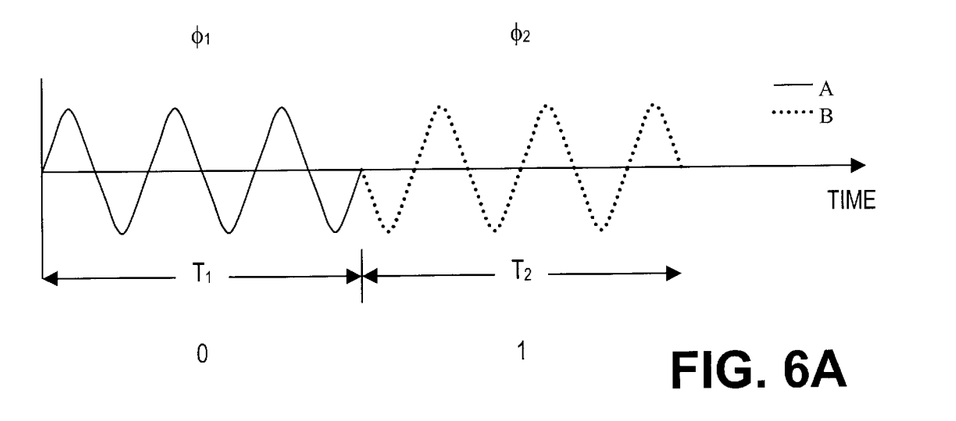
FIG. 6A is an example PSK transmission.
Figure 6B:
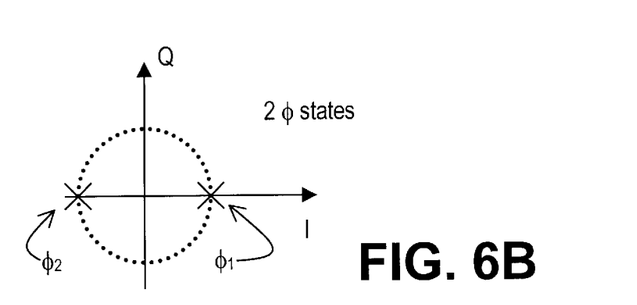
FIG. 6B shows the in-phase and quadrature components of FIG. 6A.

Referring now to FIG. 6A, a PSK transmission is shown. The PSK transmission is a two-phase PSK transmission with Signal A and Signal B having the same frequency but they are out of phase by 180°. Referring briefly to FIG. 6B, a constellation diagram illustrating the in-phase (I) and quadrature (Q) components is shown for the two-phase system of FIG. 6A with $\phi_1$ corresponding to Signal A and $\phi_2$ corresponding to Signal B.

As seen in FIG. 6A, Signal A and Signal B are transmitted during the symbol interval $T_1$ and $T_2$ respectively, and each symbol interval contains 3 cycles. Also, Signal A when transmitted represents binary bit 0 while Signal B when transmitted represents binary bit 1. In light of FIG. 6A there are several ways to improve the number of bits transmitted per unit time (i.e., data rate).

One method of increasing the data rate is to increase the carrier frequency such that the total symbol interval time decreases. Then again signal attenuation and distortion increase significantly as the carrier frequency is increased, setting fundamental limits on the improvements in data rate that are achievable by increasing the carrier frequency. Conversely, decreasing the carrier frequency provides the reward of a stronger electromagnetic signal with the added risk of aliasing with negative frequency components, and this can be especially problematic when dealing with high bandwidth signals.

Another method of increasing the data rate is by increasing the number of phase states, thereby assigning more bits to each symbol interval. For example, if the number of phase states in PSK transmission of FIG. 6A were increased to four, then each symbol interval would contain two bits of data as was previously explained with respect to FIG. 7.

An analysis of the spectral power properties of phase modulated signals is now presented with an eye toward increasing data rate. The following assumptions apply:

the carrier frequency for the signal is $\omega_c$ in radians;
the period of a cycle of the carrier is T;
the phase changes once every N cycles (N is a positive integer);
there are M possible phase states, where M is an integer >1;
for a given M, the allowable phases are taken from the set $$\left\{0, \frac{2\cdot\pi}{M}, 2\cdot\frac{2\cdot\pi}{M}, 3\cdot\frac{2\cdot\pi}{M}, \cdots (M-1)\cdot\frac{2\cdot\pi}{M}\right\}; \text{ and}$$

the data are encoded into the signal in such a way that there is no correlation between the phase states.

Given these assumptions the power spectral density for a signal is represented in Equation (3).

$$PS(\omega) = \begin{cases} \frac{1}{N\cdot T}\cdot\left[\frac{\sin\left[\frac{(\omega-\omega_c)\cdot N\cdot T}{2}\right]^2}{(\omega-\omega_c)^2} + \frac{\sin\left[\frac{(\omega+\omega_c)\cdot N\cdot T}{2}\right]^2}{(\omega+\omega_c)^2}\right], & \omega \neq \omega_c \\ \frac{1}{4\cdot N\cdot T}\cdot\left[\frac{\sin[\omega_c\cdot N\cdot T]^2}{\omega_c^2} + (N\cdot T)^2\right], & \omega = \omega_c \end{cases} \quad (3)$$

This expression is accurate for M>2. Note that due to the assumption that there is no correlation between the phase states, the case when there are two phase states (that either correlate or anticorrelate), deviates from the derived result of Equation (3). Assuming Equation (3) is accurate, it can be seen that the power spectrum of the carrier signal is independent of the number of phase states M, and as such only depends on the number of cycles N before the phase changes and the period of a cycle T. Thus, the bandwidth of the signal is not affected by increasing the number of phase states M.

As mentioned previously, the amount of noise decreases as the frequency decreases yet this may result in signal over modulation especially with wide bandwidth signals. However, in light of the derivation of Equation (3), another approach to improving data rate is to decrease the carrier frequency $\omega_c$ while increasing the number of phase states M. Effectively this results in an net data rate improvement without the risk of increasing the bandwidth to cause aliasing.

In the preferred embodiment, the carrier frequency is dropped lower than the typical electromagnetic telemetry frequencies in order to minimize the noise and maximize the received signal amplitude. It is also desirable to choose the carrier frequency such that the signal suffers the least amount of attenuation while propagating through the formation being drilled. For example, in a 5 km well with conductivity of 1 mho/meter, a frequency of about 0.5 Hz would be about 44 dB stronger than a 5 Hz signal. Thus carrier frequencies lower than 1 Hz are desired in the preferred embodiment.

With the use of the disclosed PSK telemetry system employing an increased number of phase states, a significant data rate increase is achievable. Equation 5 details the effect of the number of phase states and frequency on signal to noise ratio in going from a bi-phase signal with a carrier of $f_0$ to a signal with $2^N$ phases having a carrier of $f_1$, (where $f_0$ and $f_1$ are in Hz and N is the number of bits transmitted per cycle).

$$\Delta SNR = 20\cdot\log_{10}\left[\sin\left(\frac{\pi}{2^N}\right)\cdot\sqrt{\frac{f_0}{f_1}}\right] \quad (4)$$

Thus, in order to increase the number of bits a penalty is paid in the signal to noise ratio, but this can be offset by dropping the frequency, because the signal to noise ratio is reduced as the frequency is decreased.

Figure 9:
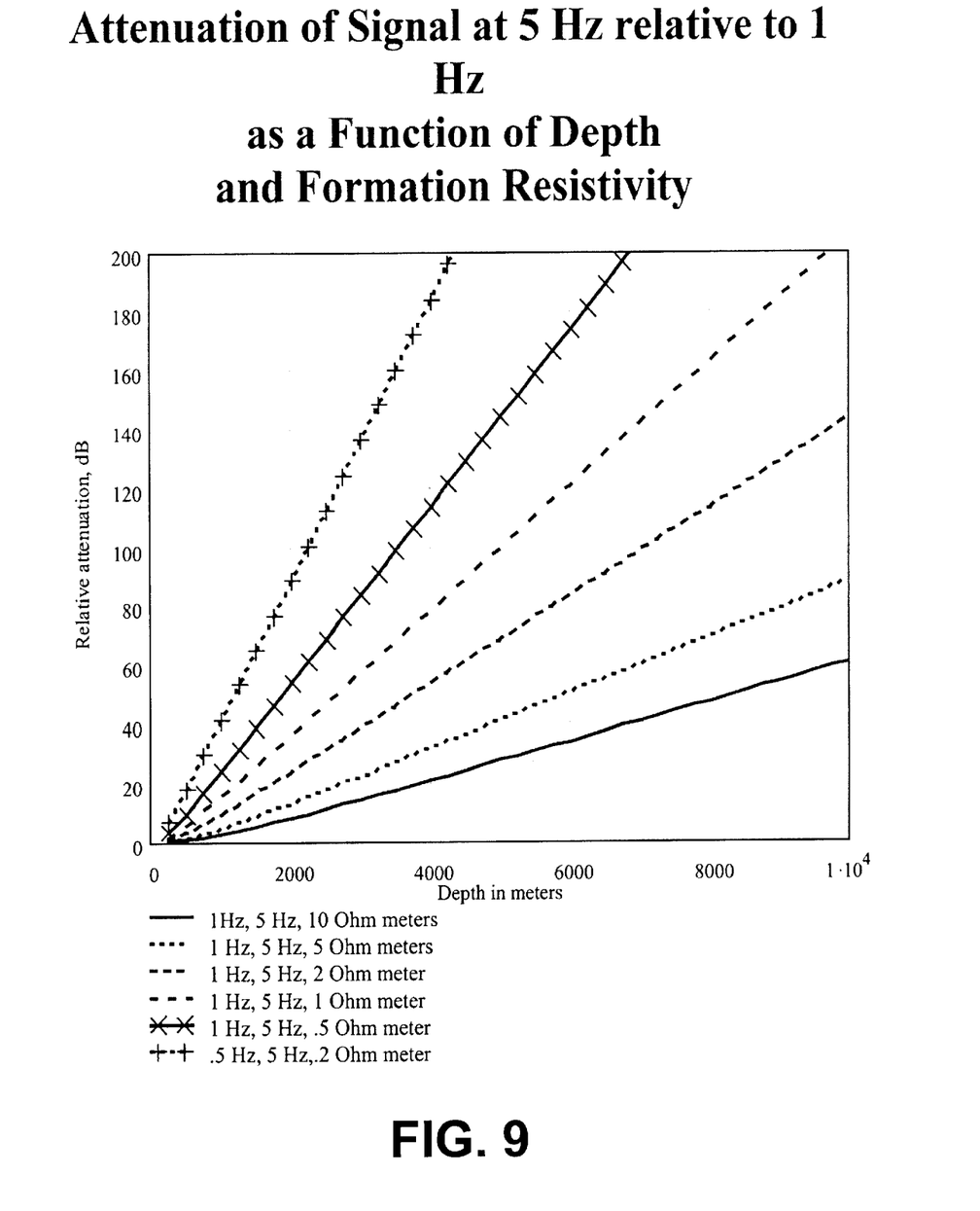
FIG. 9 shows the effects of frequency and formation resistivity on signal attenuation.

For example, if the carrier frequency is dropped from 5 Hz to 1 Hz and the number of bits per cycle are changed from 1 to 10, a 43 dB loss in signal to noise ratio is expected from equation (4). Thus in order realize the benefits of a 100% data rate increase despite the drop in SNR, the increase in signal strength that comes from decreasing the frequency to 1 Hz should be at least 43 dB. Referring now to FIG. 9, the effects of frequency and resistivity on the attenuation of a carrier signal decreasing from 5 Hz to 1 Hz, as a function of depth and formation resistivity is shown, and assuming a formation resistivity of 1 ohm per meter and a well depth of 5 km, an increase of about 100 dB is expected. Thus, the disclosed PSK telemetry system offers higher data rates while overcoming disadvantages typically associated with decreasing the carrier frequency.

The spectrum resulting from the PSK signal is fairly compact around the carrier frequency, which allows for other frequencies to be used concurrently. By using multiple frequencies, more information can be transmitted to the surface. Data rates may therefore be increased as long as minimal inter-symbol interference is achieved. Many feasible carrier frequency ratios exist between the multiple frequencies, although it is believed that a ratio of about 38/15 is preferable. For example, if a first carrier frequency is 0.5 Hz, another carrier frequency of 0.5 Hz*38/15 or about 1.267 Hz could be used concurrently. However the system is not so limited and may use multiple frequencies. For example if the lowest carrier frequency is 0.1 Hz then a preferred sequence could be multiples of 38/15 times the lowest carrier frequency (0.1 Hz, 0.2533 Hz, 0.64177 Hz, 1.6258 Hz), and the main communication channel is preferably 0.64177 Hz.

Aside from PSK signal transmission techniques, amplitude modulation (AM) techniques may also be used where the carrier frequency has been dropped into a regime where signal losses due to dissipation are small. Amplitude modulation of the carrier results in sideband generation that increases the bandwidth. However, a low bandwidth may be obtained by transmitting single-sideband because it contains the information as contained in the message signal. Methods for transmitting single-sideband amplitude modulation would be evident to one of ordinary skill in the art and are therefore not discussed here.

Figure 10:
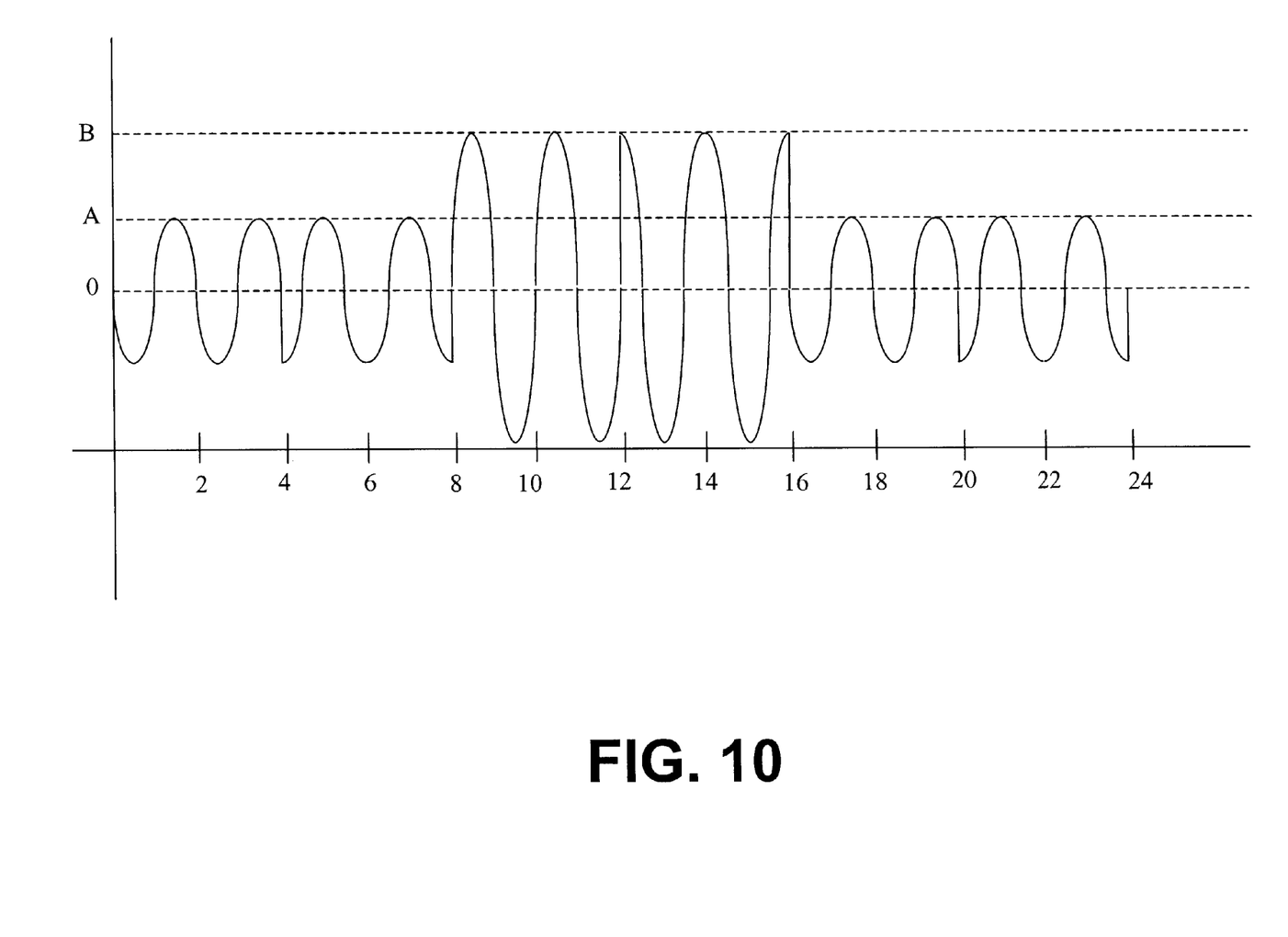
FIG. 10 shows an exemplary phase and amplitude modulated signal.

In yet another embodiment, the carrier signal(s) may be modulated in both phase and amplitude. The modulation may take the form of Quadrature Amplitude Modulation (QAM), or the phase modulation may be done independently of the amplitude modulation. As an example of this later case, one of the carrier frequencies (e.g., 0.5 Hz) may be phase modulated with a 32-PSK constellation at 0.25 symbols per second, and amplitude modulated to four power levels at 0.125 symbols per second, for a total bit rate of 1.5 bits/sec on one carrier. An example of such a modulated signal is shown in FIG. 10. Again, multiple carrier frequencies may be used concurrently.

It should be mentioned that any number of phase states greater than two may be advantageously used in the PSK electromagnetic telemetry system disclosed above, and that this number is not necessarily limited to a power of two. Other antenna configurations may also be used, while still employing the transmission techniques disclosed herein. The telemetry data may also be encoded with an error correction code or may be compressed. Numerous other variations and modifications will become apparent to those skilled in the art once the above disclosure is fully appreciated. It is intended that the following claims be interpreted to embrace all such variations and modifications.

What is claimed is:

1. A downhole telemetry system that comprises:
   an antenna configured to transmit low frequency electromagnetic signals; and
   a phase-shift key (PSK) transmitter configured to receive digital signals indicative of telemetry data and configured to convert the digital signals into a PSK transmit signal, wherein the PSK transmitter provides the transmit signal to the antenna,
   wherein the PSK transmit signal has a carrier frequency of no more than about 1 Hz, and
   wherein the PSK transmit signal has a signal constellation with more than 4 phase states.

2. The system of claim 1, wherein the signal constellation consists of 8 phase states.

3. The system of claim 1, wherein the signal constellation consists of 16 phase states.

4. The system of claim 1, wherein the signal constellation includes 32 phase states or more.

5. The system of claim 1, wherein the signal constellation includes 256 phase states.

6. The system of claim 1, wherein the signal constellation includes 1024 phase states.

7. The system of claim 1, wherein the PSK transmit signal has a symbol period of at least about four carrier cycles.

8. The system of claim 1, wherein the PSK transmit signal has a symbol period of about three carrier cycles.

9. The system of claim 1, wherein the PSK transmit signal has a symbol period of about two carrier cycles.

10. The system of claim 1, wherein the carrier frequency is about 0.5 Hz.

11. The system of claim 1, wherein the PSK transmit signal is also amplitude modulated.

12. A method of logging while drilling, wherein the method comprises:
    drilling a hole through a formation with a drill bit attached to a drill string that includes a sensor package;
    detecting signals indicative of formation properties;
    determining telemetry information from the detected signals;
    providing the telemetry information to a PSK transmitter;
    encoding the telemetry information to obtain a digital transmit signal;
    phase modulating the digital transmit signal on a low-frequency carrier signal to obtain a PSK signal; and
    transmitting the PSK signal to a surface receiver,
    wherein the low-frequency carrier signal has a frequency of no more than about 1 Hz, and
    wherein the PSK signal has a signal constellation with more than 4 phase states.

13. The method of claim 12, wherein the signal constellation includes 32 phase states or more.

14. The method of claim 12, wherein the signal constellation includes 256 phase states.

15. The method of claim 12, wherein the signal constellation includes 1024 phase states.

16. The method of claim 12, wherein the carrier frequency is about 0.5 Hz.

17. The method of claim 12, further comprising:
    receiving the PSK signal at the surface;
    determining telemetry information from the received PSK signal; and
    associating the telemetry information with a position of the sensor package.

18. The method of claim 12, wherein the PSK transmit signal is also amplitude modulated.

19. A downhole telemetry system that comprises:
    an antenna configured to transmit low frequency electromagnetic signals; and
    a phase-shift key (PSK) transmitter configured to receive digital signals indicative of telemetry data and configured to convert the digital signals into a PSK transmit signal,
    wherein the PSK transmit signal contains multiple concurrent carrier frequencies, wherein at least one of the concurrent carrier frequencies is no more than about 1 Hz, and wherein the PSK transmit signal has a signal constellation with more than 4 phases states.

20. The system of claim 19, wherein the signal constellation consists of 8 phase states.

21. The system of claim 19, wherein the signal constellation consists of 16 phase states.

22. The system of claim 19, wherein the signal constellation includes 32 phase states or more.

23. The system of claim 19, wherein the signal constellation includes 256 phase states.

24. The system of claim 19, wherein the signal constellation includes 1024 phase states.

25. The system of claim 19, wherein the PSK transmit signal has a symbol period of at least about four carrier cycles.

26. The system of claim 19, wherein the PSK transmit signal has a symbol period of about three carrier cycles.

27. The system of claim 19, wherein the PSK transmit signal has a symbol period of about two carrier cycles.

28. The system of claim 19, wherein the carrier frequencies are separated by a ratio of about 38/15.

29. The system of claim 19, wherein the PSK transmit signal is also amplitude modulated.

30. A method of logging while drilling, wherein the method comprises:
    drilling a hole through a formation with a drill bit attached to a drill string that includes a sensor package;
    detecting signals indicative of formation properties;
    determining telemetry information from the detected signals;
    providing the telemetry information to a transmit transmitter;
    encoding the telemetry information to obtain a digital transmit signal;

phase modulating the digital transmit signal on multiple low-frequency carrier signals to obtain a transmit signal, wherein at least one of the multiple carrier frequencies is no more than about 1 Hz and the transmit signal has a signal constellation with more than 4 phase states; and transmitting the transmit signal to a surface receiver.

31. The method of claim 30, wherein the multiple low-frequency carrier signals are separated by a ratio of about 38/15.

32. The method of claim 31, wherein the signal constellation includes 32 phase states or more.

33. The method of claim 31, wherein the signal constellation includes 256 phase states.

34. The method of claim 31, wherein the signal constellation includes 1024 phase states.

35. The method of claim 31, further comprising:

receiving the transmit signal at the surface;

determining telemetry information from the received transmit signal; and associating the telemetry information with a position of the sensor package.

36. The method of claim 30, wherein the transmit signal is also amplitude modulated.

* * * * *